United States Patent [19]

Rosenplenter

[11] Patent Number: 5,520,950
[45] Date of Patent: May 28, 1996

[54] EDIBLE COMPOSTION AND A PROCESS FOR ITS PREPARATION

[75] Inventor: Kurt C. Rosenplenter, Alpen, Germany

[73] Assignee: Cerestar Holding B.V., Sas van Gent, Netherlands

[21] Appl. No.: 340,292

[22] Filed: Nov. 14, 1994

[30] Foreign Application Priority Data

Nov. 13, 1993 [GB] United Kingdom ............... 9323483

[51] Int. Cl.$^6$ .................................................. A23G 3/00
[52] U.S. Cl. ..................... 426/660; 426/679; 426/631; 426/632
[58] Field of Search .................. 426/601, 602, 426/610, 606, 631, 632, 633, 660

[56] References Cited

U.S. PATENT DOCUMENTS

| | | | |
|---|---|---|---|
| 2,780,549 | 2/1957 | Bloch | 426/632 |
| 2,955,040 | 10/1960 | Avera | 426/632 |
| 3,969,514 | 7/1976 | Tiemstra | 426/633 |
| 4,536,408 | 8/1985 | Morehouse et al. | 426/603 |
| 4,661,360 | 4/1987 | Smith | 426/633 |
| 4,869,919 | 9/1989 | Lowery | 426/604 |
| 5,230,919 | 7/1993 | Walling et al. | 426/633 |
| 5,240,726 | 8/1993 | Zook et al. | 426/601 |

FOREIGN PATENT DOCUMENTS

| | | |
|---|---|---|
| 0204941 | 12/1986 | European Pat. Off. . |
| 0237120 | 9/1987 | European Pat. Off. . |
| 0327288 | 8/1989 | European Pat. Off. . |
| 0390299 | 10/1990 | European Pat. Off. . |
| 57-141281 | 9/1982 | Japan . |
| 1271050 | 4/1972 | United Kingdom . |
| 9201390 | 2/1992 | WIPO . |
| 9317565 | 9/1993 | WIPO . |

*Primary Examiner*—Jeanette Hunter
*Attorney, Agent, or Firm*—Cushman Darby & Cushman

[57] ABSTRACT

An edible composition, specifically to a nut spread which is equivalent in its sensory properties to the normal nut spread. The spread contains no sugar and considerably less fat and a method for obtaining the sugarless nut spread.

19 Claims, No Drawings

EDIBLE COMPOSTION AND A PROCESS FOR ITS PREPARATION

The present invention relates to an edible composition, in particular to an edible confectionary composition in which the ingredients are so chosen as to produce a composition having fewer calories than the equivalent conventional product.

There is at the present time an increasing public demand for low calorie products in the interests of maintaining a healthier life style. In particular there is a demand for lower calorie replacements of well established products having a relatively high calorie content. The problem for the manufacturer however is how to produce such a lower calorie product having the same taste and sensory properties as the product it is intended to replace given that such properties are usually conferred by the fat and sugar content of the product. On a weight for weight basis sugar (sucrose) has a lower calorie content than fat and of the two it is probably easier to find a satisfactory replacement for sugar but it is particularly difficult to replace both sugar and fat in the same composition without detracting significantly from the properties of the latter, especially with respect to the mouth-feel.

One popular edible composition is the type of confectionary composition which contains sugar, fat and nuts usually in finely ground form and which is sufficiently soft to be spreadable. Such a composition frequently contains cocoa powder to give a chocolate-flavoured nut spread which depends for its flavour and texture on the sugar/nut/fat content and on the relative proportion of these three ingredients. After a prolonged investigation we have now devised a composition which is equivalent in its sensory properties to this type of nut spread but which contains no sugar and considerably less fat and has therefore significantly fewer calories than the conventional nut spread.

The edible compositions according to the present invention achieve their sweetness by use of a maltitol-containing sugar alcohol syrup while the fat element is reduced by using a combination of substances comprising maltodextrin and a small amount of vegetable fat and, optionally but preferably, a proteinaceous substance. This combination gives mouth-feel and sensory properties akin to the conventional higher calorie product.

Accordingly, the invention comprises an edible composition of the nut spread type comprising the following constituents:

30 to 60% of the composition of a sugar alcohol syrup containing maltitol in an amount between 50 and 90% of the syrup, 5 to 20% of the composition of finely ground edible nuts, 3 to 15% preferably 3 to 12% of the composition of a low DE maltodextrin, preferably a potato or a tapioca maltodextrin, 5 to 20% of the composition of a vegetable fat, 0 to 30% preferably 7 to 20% of the composition of water an emulsifier in an mount sufficient to keep the composition as a stable emulsion and, optionally and according to taste, one or more flavours and/or one or more intense sweeteners.

All the percentages in this specification and claims, including those given above, are, unless indicated to the contrary, by weight.

A particularly favoured composition also contains 1 to 10%, more preferably 2 to 6% based on the composition of cocoa powder.

The sugar alcohol syrup contains 50 to 90% maltitol, preferably 70 to 80%, more preferably 74 to 78%. The other sugar alcohols in the syrup are usually sorbitol, maltotriitol and higher sorbitol oligomers. Such syrups may be produced by the hydrogenation of a starch hydrolysate containing glucose, maltose, maltotriitose and higher glucose oligomers.

The type of nut used in the compositions according to invention may be chosen from those conventionally used in this type of product eg. hazelnuts, pecan nuts, walnuts, almonds etc. The nuts should be finely ground and in the form of a smooth paste and are preferably present in an amount which is at least 8% of the composition, more preferably 8 to 16%.

The composition contains a maltodextrin which contributes to the fat-like properties of the product. This maltodextrin has a low DE (dextrose equivalent) e.g. a DE of 2 to 8, preferably 2 to 6. It is also advantageous to include in the composition a second maltodextrin having a higher DE e.g. 9 to 20, preferably 15 to 20, which may be a maltodextrin derived from any form of grain or tuber starch but is preferably a maize (corn) maltodextrin. The amount of this higher DE maltodextrin in the composition may be 0.5 to 5%, preferably 0.5 to 3.0% more preferably 0.5 to 1.5% of the composition.

The vegetable fat component of the composition should have the characteristics of such fats which are generally used in confectionary and other foods ie it should have a reasonably hard consistency, stability and a short melting range just below blood temperature eg in the range 27° to 37° C., preferably 30° to 32° C. The amount of fat used is 5 to 20% of the composition preferably 8 to 15%.

The water content of the composition may be 5 to 30% particularly 7 to 20%.

An additional improvement in the mouth-feel of the composition may be achieved by the inclusion of a proteinaceous substance suitably in a concentration of 2 to 15%. Skimmed milk powder is the preferred proteinaceous substance but a protein-containing composition such as a soya bean powder may also be used. The composition according to the invention preferably contains 2 to 15% of proteinaceous substance, more preferably 3 to 10%.

Any food grade emulsifier may be used to maintain the composition as a stable emulsion. Lecithin is suitable for this purpose particularly when used at a concentration of 0.1 to 3% of the composition. It may also be advantageous, in the interests of reducing the water content of the composition, to use lecithin in combination with another emulsifier e.g. with polyglycerol polyricinoleate. Other ingredients of the composition are optional in nature but another method of reducing the water content is to add inulin to the composition suitably up to 55% inulin. In this case not only may the water content be reduced but also the contents of vegetable fat and sugar alcohol syrup. Other optional ingredients may be in particular a flavour such as vanilla and/or an intense sweetener such as Acesulfam K. A typical concentration for a flavour would be 0.03% of the composition and for an intense sweetener also 0.03%, although both these amounts may be varied according to taste. The composition may also contain other optional ingredients e.g. a preservative, a colouring agent etc.

The compositions according to the invention are preferably prepared by a process in which the components are mixed in the following sequence. The sugar alcohol syrup and the water are first blended and heated to a temperature in the range 70° to 90° C., preferably about 80° C. All the other components of the composition except for the nuts and vegetable fat are then added while stirring. The temperature is next allowed to fall below 70° C. while continuing to stir vigorously and the fat and nut paste finally mixed intimately into the composition and the final product immediately filled into sealable containers.

The invention will now be further illustrated by reference to the following Example.

EXAMPLE

A composition was prepared from the following ingredients.

| Sugar alcohol syrup containing 75% maltitol* | 42.6% |
|---|---|
| Hazelnut paste | 12.0% |
| Vegetable fat | 9.0% |
| Potato maltodextrin (DE 2 to 5) | 6.5% |
| Corn maltodextrin (DE 17–19) | 1.0% |
| Skimmed milk powder | 6.0% |
| Cocoa powder | 4.0% |
| Lecithin | 0.3% |
| Vanilla | 0.03% |
| Acesulfam K | 0.03% |
| Water | 18.54% |

All percentages are by weight of the composition
*The syrup also contained sorbitol in an amount about 2.5% by weight of the syrup, the balance being maltotriitol and higher sorbitol oligomers.

The composition was prepared in a high speed food mixer by mixing the sugar alcohol syrup and water and heating to 80° C. All the other ingredients of the composition except for the nuts and vegetable fat were then added and stirring continued at 1500 rpm for about 1 to 2 minutes. The heat was next turned off and when the temperature had fallen to below 70° C. the fat and nut paste were stirred into the composition and the product poured into glass containers. After storage at 10° to 12° C. for approximately three days the nut spread reached the desired consistency.

The conventional commercial product equivalent to that described above contains:

| nut paste | 11.0% |
|---|---|
| sucrose | 51.17% |
| fat | 26.0% |
| skimmed milk power | 7.5% |
| cocoa powder | 4.0% |
| lecithin | 0.03% |
| vanilla | 0.03% |

This product contains 2,324 KJ/kg as compared with the product according to the invention, described above, which contains 1,267 KJ/kg. The latter has however a flavour and mouth-feel virtually indistinguishable from the conventional product.

I claim:

1. An edible composition of the nut spread type comprising: 30 to 60% of the composition of a sugar alcohol syrup containing maltitol in an amount between 50 and 90% of the syrup, 5 to 20% of the composition of finely ground edible nuts, 3 to 15% of the composition of a low DE maltodextrin, 5 to 20% of the composition of a vegetable fat, 0 to 30% of the composition of water, an emulsifier in an amount sufficient to keep the composition as a stable emulsion and, optionally according to taste, one or more flavours and/or one or more intense sweeteners.

2. A composition according to claim 1 which also contains 1 to 10%, of the composition of cocoa powder.

3. A composition according to claim 1 or claim 2 in which the sugar alcohol syrup contains 70 to 80% maltitol based on the syrup.

4. A composition according to claim 1 in which the nuts are hazelnuts, pecan nuts, walnuts or almonds in an amount which is 8 to 16% of the composition.

5. A composition according to claim 1 in which the maltodextrin is a potato maltodextrin of DE 2 to 8.

6. A composition according to claim 1, wherein said composition also contains a second maltodextrin having a DE of 9 to 20.

7. A composition according to claim 1 or 2, wherein the vegetable fat has a melting point in the range 27° to 37° C.

8. A composition according to claim 1, wherein said composition further comprises a proteinaceous substance.

9. A composition according to claim 1 which comprises
   30 to 60% of the composition of a sugar alcohol syrup containing maltitol in an amount between 70 and 80% of the syrup,
   8 to 16% of the composition of finely ground hazelnuts or almonds,
   3 to 12% of the composition of a potato maltodextrin of DE 2 to 6
   0.5 to 3% of the composition of a corn maltodextrin having a DE of 15 to 20,
   8 to 15% of the composition of a vegetable fat,
   1 to 10% of the composition of cocoa powder,
   7 to 20% of the composition of water
   3 to 10% of the composition of skimmed milk powder,
   0.1 to 3% of an emulsifier and optionally at least one of an intense sweetener and a flavoring agent.

10. A process for the preparation of a composition according to claim 1 which comprises the following steps in sequence, (a) the sugar alcohol syrup and the water are blended and heated to a temperature between 70° and 90° C., (b) all the remaining ingredients of the composition except for the ground nuts and vegetable fat are added while stirring, (c) the temperature is allowed to fall below 70° C. while stirring vigorously and the vegetable fat and nut paste are mixed intimately into the composition and, (d) the product is filled into sealable containers.

11. A composition according to claim 2, wherein said composition contains 2 to 6% of cocoa powder.

12. A composition according to claim 1, wherein said composition also contains a second maltodextrin having a DE of 9 to 20, and said second maltodextrin is present in said composition at a concentration of 0.5 to 5% of said composition.

13. A composition according to claim 1, wherein the vegetable fat has melting point in the range of 30° to 32° C.

14. A composition according to claim 9, wherein said emulsifier is lecithin.

15. A composition according to claim 1, wherein said composition further comprises a second maltodextrin having a DE higher than said low DE maltodextrin, said second maltodextrin having a DE of 15 to 20.

16. A composition according to claim 1, wherein said low DE maltodextrin is a potato or tapioca maltodextrin.

17. A composition according to claim 9, wherein said composition contains an intense sweetener and at least one flavoring agent.

18. A composition according to claim 1, wherein said composition contains 30–60% of said sugar alcohol syrup, 5–20% of said finely ground edible nuts, 3–12% of said low DE maltodextrin, 5–20% of said vegetable fat, and 7–20% of water, said composition further containing an emulsifier in an amount sufficient to keep the compositions as a stable emotion.

19. A composition according to claim 8, wherein said proteinaceous substance comprises skim milk.

\* \* \* \* \*